June 2, 1942. J. R. GOMERSALL 2,285,156
ELECTRIC TOASTER
Filed Sept. 25, 1941 3 Sheets-Sheet 1
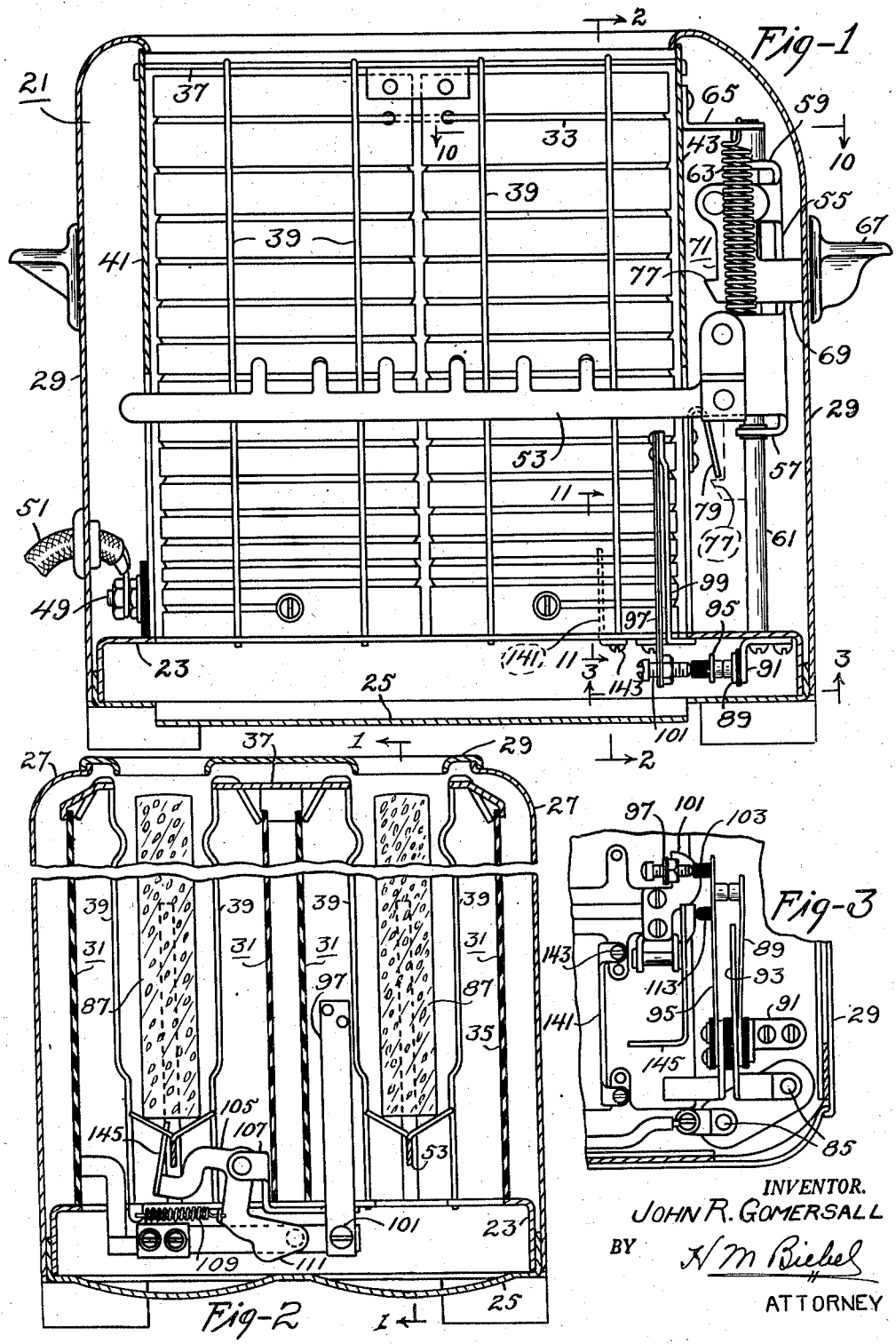
INVENTOR.
JOHN R. GOMERSALL
BY
ATTORNEY

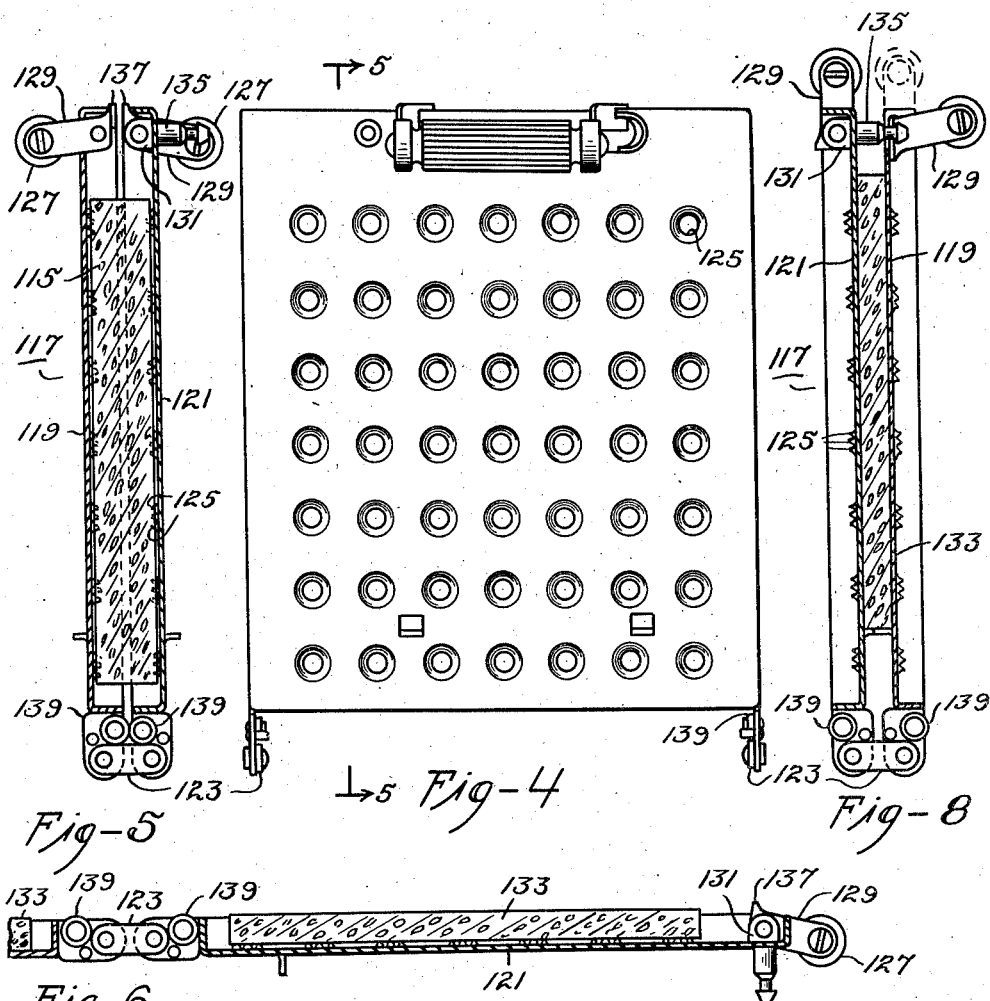

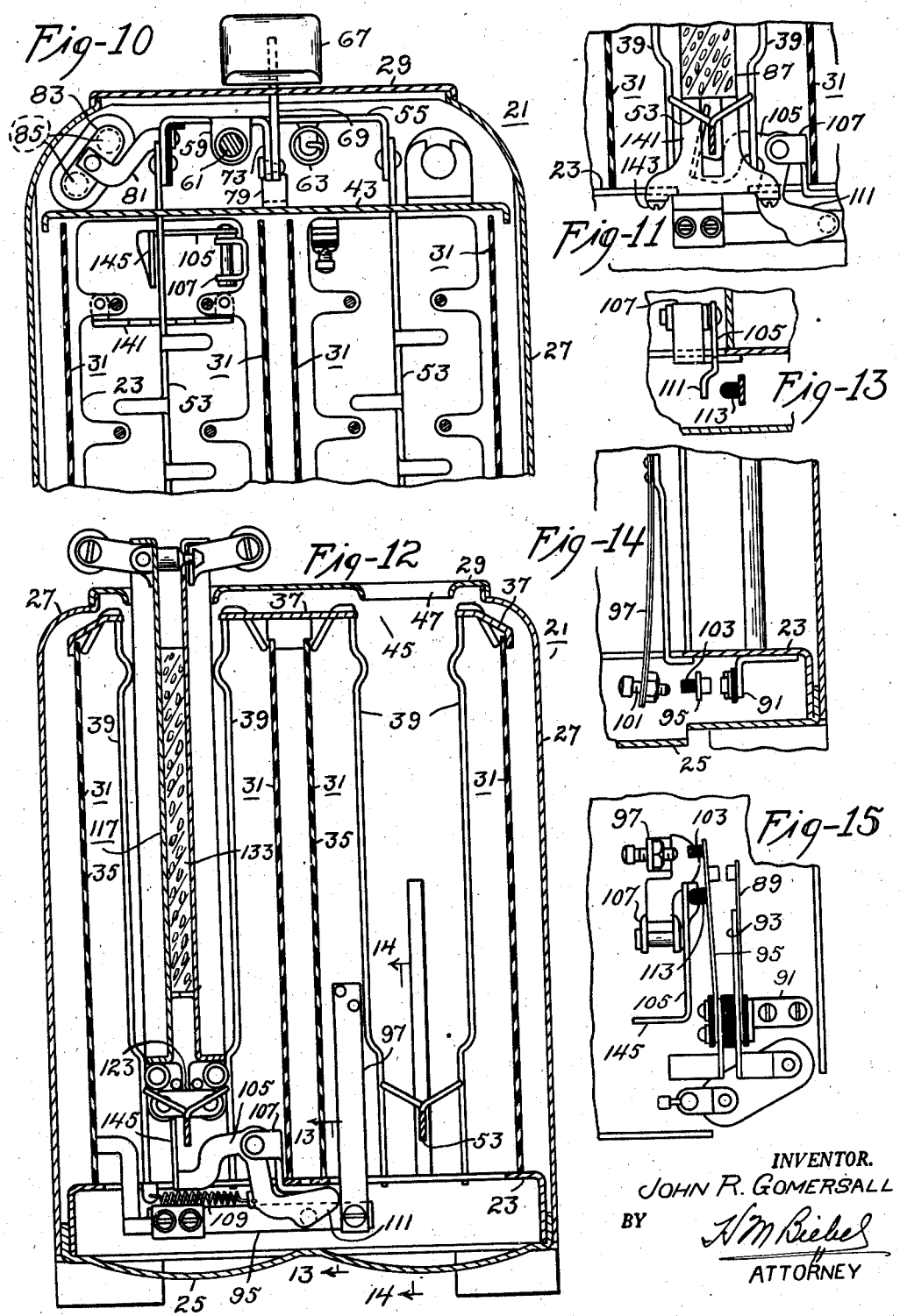

Patented June 2, 1942

2,285,156

UNITED STATES PATENT OFFICE 2,285,156

ELECTRIC TOASTER

John R. Gomersall, Elgin, Ill., assignor to McGraw Electric Company, Elgin, Ill., a corporation of Delaware Application September 25, 1941, Serial No. 412,216

5 Claims. (Cl. 219—19)

My invention relates to electric cooking devices and particularly to electric toasters.

An object of my invention is to provide a toaster for toasting either a slice of bread of ordinary thickness or a slice of relatively thin bread as may be desired by the user.

Another object of my invention is to provide an electric toaster embodying means to control the temperature of the toasting chamber when a thin slice of bread positioned in a holder is being toasted.

Another object of my invention is to provide an electric toaster embodying means to surface toast a slice of bread by radiant high temperature heat or to toast a thin slice of bread throughout its entire thickness by conducted heat of lower temperature.

Other objects of my invention will either be apparent from a description of one form of device embodying my invention or will be pointed out in the course of such description and set forth more particularly in the appended claims.

In the drawings,

Figure 1 is a longitudinal vertical sectional view through a toaster embodying my invention taken on the line 1—1 of Fig. 2, the parts being shown in non-toasting positions, Fig. 2 is a vertical cross sectional view on the line 2—2 of Fig. 1, the parts being shown in toasting position, Fig. 3 is a fragmentary view on the line 3—3 of Fig. 1 showing the position of certain parts during a standard toasting operation, Fig. 4 is a side elevational view of a bread slice holder, Fig. 5 is a sectional view therethrough taken on the line 5—5 of Fig. 4 showing the holder as enclosing a slice of bread of normal or standard thickness ready to slice the same into two thinner pieces of bread, Fig. 6 is a view showing the bread slice holder opened for removal of the two thinner slices of bread, Fig. 7 is a fragmentary sectional view showing the position of the holder after removal of the bread slices, Fig. 8 is a sectional view showing the bread holder in position for clamping a thin slice of bread prior to inserting the holder and the slice of bread in the toaster, Fig. 9 is a diagram of the electrical circuits of the toaster, Fig. 10 is a fragmentary horizontal sectional view taken on the line 10—10 of Fig. 1, Fig. 11 is a vertical fragmentary sectional view taken on the line 11—11 of Fig. 1 showing more particularly a bread slice guard-rest operative when a standard slice of bread is being toasted, Fig. 12 is a sectional view similar to that of Fig. 2 except that the slice holder of Fig. 8 has been inserted in the toasting chamber and the parts are shown in toasting positions, Fig. 13 is a vertical fragmentary sectional view on the line 13—13 of Fig. 12, Fig. 14 is a vertical fragmentary sectional view taken on the line 14—14 of Fig. 12 showing the positions of the thermal heater control switch effective when a thin slice of bread is being toasted, and, Fig. 15 is a fragmentary view similar to that of Fig. 3 except the parts are shown in the positions occupied by them as shown in Fig. 14.

I have elected to show my invention as embodied in a non-automatic two-slice toaster 21 but I desire it to be understood that my invention is not limited thereto but may also be embodied in a single-slice toaster or a plural-slice toaster adapted to toast more than two slices of bread simultaneously.

The toaster 21 includes a metal bottom plate 23 which may be of inverted pan shape and may have associated therewith a crumb tray 25, both of these parts being secured together in any suitable or desired manner. I provide also an outer casing comprising metal side walls 27 and a central portion 29 which may be caused to interfit with each other and be operatively associated with members 23 and 25 in any suitable or desired manner now well known in the art.

I prefer to provide a pair of vertically extending planar heating elements 31 for each slice of bread adapted to be toasted simultaneously in such a toaster and I have shown the vertically extending relatively thin sheets of electric insulating material, such as mica, and it is to be understood that a resistor strand 33 is supported by the mica sheets, all in a manner well known in the art. Any suitable or desired means may be provided to hold the lower edges of the mica sheets in proper operative position on bottom member 23 and the upper edges of these sheets 35 may be held in properly spaced operative positions by a top frame plate 37 and return-bent ends of guard or guide wires 39, the upper end portions of which interfit with the top frame plate 37. I provide also a rear intermediate wall 41 and a front intermediate wall 43 which may be considered to cooperate with either the planar heating elements or the side walls of the outer casing to provide a plurality of toasting chambers. The top frame plate is provided with openings 45 for the insertion of slices of bread and the removal of the toasted slices of bread, these openings registering with similar openings 47 in the central or mid portion 29 of the outer casing.

A pair of terminal members 49 are insulatedly supported by the rear intermediate wall 41 and a twin conductor cord 51 may be connected therewith to permit of energizing the heating elements.

I provide bread carriers 53, one of each of these carriers being located between cooperating pairs of toast heating elements 31 and these carriers have their front end portions connected together by a crosswise-extending bar or member 55, as will be noted more particularly in Fig. 10 of the drawings. Member 55 is of generally plate shape and has laterally extending lower and upper projecting portions 57 and 59 having apertures therein to permit of their being mounted on a vertical standard 61 whereby it is possible to move the bread carriers vertically relatively to the toast heating elements. Fig. 1 of the drawings shows the bread carriers in their upper or non-toasting position and Figs. 2 and 12 show them in their lower or toasting positions. Means for normally yieldingly biasing the bread carriers into their upper non-toasting position may comprise a coil spring 63 one end of which is connected to a bracket 65 which is adapted also to hold the upper end of standard 61, the lower end of coil 63 being connected to any suitable part of member 55. An actuating knob 67 is secured to a projection 69 which constitutes a substantially horizontally extending arm of a bell crank lever 71. The arm 69 extends through a slot in the front wall of the outer casing to permit an operator to press downwardly on the knob 67 to move the bread carriers into their lowermost or toasting position. The bell crank lever 71 is pivotally mounted on a projection 73 constituting a part of or being secured to member 55 and arm 71 has a hook end 77 thereon which is adapted to engage a detent 79 secured to the front intermediate wall 43 at a height thereon to hold the carriers in their lower toasting position when hook 77 engages under detent 79. In order to terminate a toasting operation the operator pushes upwardly on knob 67 to cause turning movement of bell crank lever 71 on its pivotal support with attendant disengagement of portion 77 from detent 79, the coil spring 63 then causing quick upward movement of the carriers into non-toasting position.

Member 55 has secured thereto a bracket 81 suitably electrically insulated therefrom this bracket supporting a contact bridging member 83 adapted to engage a pair of contact members 85 insulatedly supported on the top portion of member 23, the contact bridging member 83 and the contacts 85 constituting a main heater control switch which, as is evident, is adapted to be closed when the operator moves the bread carriers downwardly into toasting position and is adapted to be opened when the carriers are released, as above described, and moved upwardly by the coil spring 63.

My improved toaster is designed to toast at one time, either one or two slices of bread of normal or standard thickness and I have shown two such slices of bread 87 in Fig. 2 of the drawings as being positioned in their lower or toasting positions and therefore subject to radiant heat of relatively high temperature as is now customary in electric toasters in which surface toasting alone is being effected.

My improved toaster is also designed to make the so-called "Melba" toast using relatively thin slices of bread and to heat treat the slice or slices of bread until the entire thickness thereof has been uniformly toasted or browned. I have found it necessary when doing this latter kind of toasting to use a lower temperature heat and, when it is desired to prevent curving of the relatively thin slice of bread, I have found it necessary to use a bread slice holder comprising a pair of metal plates each one of which engages a side surface of the slice of bread and also, to regulate or control the temperature of the heat reaching the bread. Further, I have found it necessary to subject the thin slice of bread to a toasting operation of greater length than is necessary or desirable when merely surface toasting a normal slice of bread.

In order to be able to control the temperature of the toasting chamber, I provide a normally inoperative thermal heater control switch which includes a resilient contact arm 89 supported as by a bracket 91 secured to the under side of member 23, a relatively rigid arm 93 being also supported by bracket 91 and having a portion thereof connected to one of the contact members 83 hereinbefore described. Normally the contact arm 89 is biased away from the relatively rigid arm 93, as is shown more particularly in Fig. 3 of the drawings. I provide further a second contact arm 95 also supported from the bracket 91 and, as shown, these two contact arms are insulatedly supported by bracket 91 and are also insulated from one another.

I provide a bimetal bar 97 which extends vertically of and in one of the toasting chambers and has its upper end supported by a bracket 99 as shown more particularly in Fig. 1 of the drawings. The lower movable end of bar 97 has mounted thereon an adjusting screw 101 which is adapted to engage a lug 103 of electric insulating material, which lug is secured to the outer end of contact arm 95. It is to be here noted that contact arm 95 is biased away from contact arm 89 but is normally held in engagement therewith as through contact members on the two arms 95 and 89 by the bimetal bar 97 when the bimetal bar is at a low temperature or at least is below a given temperature. Bimetal bar 97 will move or flex in a clockwise direction as seen in Fig. 1 of the drawings when it is heated and member 101 will move out of engagement with member 103 at a certain temperature with simultaneous disengagement of the two contact members on the arms 89 and 95 whereby the thermal heater control switch is moved to heater deenergizing position.

It is, therefore, evident that when a slice of bread of normal thickness is being toasted or when a thin slice of bread is being toasted, bimetal bar 97 will move out of engagement with the contact arm of the switch controlled thereby with attendant opening of this switch and since opening of this auxiliary and thermally controlled switch is not desired when a slice of bread of normal thickness is being surface toasted, I provide means normally effective to maintain the contact arms 89 and 95 in engagement with each other. This means includes a bell crank lever 105 pivotally supported on a bracket 107 and normally biased into position to engage contact arm 95 and hold it in engagement with contact arm 89 by means of a small coil spring 109 (see Fig. 2). Bell crank lever 105 is provided with a lower or right-hand arm 111 having a cam surface thereon so shaped that when the arm is in the position shown in Fig. 2 of the drawings, it will be in engagement with a lug 113 of electric insulating material on contact arm 95 to hold this contact arm in engagement with contact arm 89 to thereby maintain the thermally controlled switch in closed position. If and when bell crank lever 105 is moved, in a manner to be hereinafter described, into the position shown in Fig. 12 of the drawings, the cam surface will no longer be in engagement with lug 113 so that contact arm 95 under its inherent bias, may move to switch-opening position when permitted to do so by the flexing bimetal bar 97. These positions are shown particularly in Figs. 14 and 15 of the drawings.

As has been hereinbefore stated, I have found it desirable when making so-called "Melba" toast to cut a slice of bread of normal thickness into two slices of bread each of substantially half the normal thickness and further, I have found it desirable to remove the crust from the four edges of the slices of bread and Fig. 5 shows a slice 115 of the normal thickness with the crusts removed and placed in a holder 117 ready to be cut into two thinner slices.

This holder includes two flat relatively thin sheet metal plates 119 and 121 which are pivotally connected with each other as by two short bars 123 secured to the respective lower ends of side portions of the plates 119 and 121. It will be noted that the plates 119 and 121 are of dished shape having laterally extending flanges on each of their four edges.

Each of the plates 119 and 121 is provided with embossed projections 125 which extend toward each other when the two plates are located in the positions shown in Fig. 5 of the drawings, to thereby cause the spurs or projections 125 to engage the outer surfaces of the slice of bread 115 to hold the same while being cut in two by a thin knife and it will be noted that the two plates 119 and 121 are adapted to be supported with the lateral flange portions spaced apart from each other bw substantially the thickness of the bread slicing knife.

In order to handle conveniently the holder 117 I may provide a pair of handles 127 made of a suitable heat-insulating or moulded composition mounted on arms 129 which are pivotally mounted on projections 131 at that edge of the plates away from their pivotal connection and on the dished side thereof.

Fig. 6 of the drawings shows the holder 117 after it has been opened out to permit of withdrawing or removing the two thin slices of bread 133 from the holder. When this has been done the two plates 119 and 121 are turned still further so that they may receive therebetween a slice 133 of bread, as is shown in Fig. 8 of the drawings and it will be noted that now the spurs or projections 125 extend away from each other since they are now located near or on the outer surfaces of plates 119 and 121.

I provide a headed lug 135 on each of the plates 119 and 121 which are adapted to be engaged by laterally-bent end portions 137 of the pivotally mounted arms 129 to permit of holding the two plates 119 and 121 in substantially parallel-extending positions relatively to each other to thereby tightly hold the slice of bread 133 and prevent its curling or curving during the toasting operation to which it is now ready to be subjected.

I may here point out that I provide rollers 139, one on each of the lower end portions of the plates 119 and 121, which are adapted to be located relatively close together as shown in Fig. 5 of the drawings, to constitute a relatively simple and effective means to prevent excessive or undesired downward movement of the bread slicing knife when the bread holder parts are in the positions shown in Fig. 5 of the drawings.

As was hereinbefore stated, the toaster embodying my invention and disclosed herein, is adapted to toast slices of bread 87 of normal thickness and I prefer to provide a bread-stopping member 141 shown more particularly in Fig. 11 of the drawings as comprising a thin sheet metal plate having portions secured by short machine screws 143 to member 23 and having two upwardly extending arms and so constructed and mounted as to support at least one bottom corner of one slice of bread in a two-slice toaster.

Bell crank lever 105 is provided with a substantially vertically extending projection 145 which is of such length as to extend normally slightly above the bread carrier 53 when the same is in its lowermost toasting position but is not engaged by a slice of bread 87 when normal toasting of a slice of bread of normal thickness is to be effected.

However, when a slice of bread 133 in the holder 117 is to be toasted, the holder 117, and particularly the short member 123, is adapted to engage the end of projection 145 and cause turning movement of bell crank lever 105 in a counterclockwise direction whereby the portion of the cam surface on part 111 thereof will be moved out of switch-locking position so that when permitted to open by movement of the heated bimetal bar 97, as hereinbefore described, contact arm 95 will move out of engagement with contact arm 89 when the temperature of the toasting chamber has reached a predetermined value.

Since it is desired to thoroughly or totally toast the entire thickness of a thin slice of bread 133 and since it is necessary to subject such thin slice of bread to lower temperature heat for a greater length of time, the two plates 119 and 121, one on each side of the thin slice of bread 133, are effective to transform the character of the heat reaching the slice of bread and also to greatly reduce the temperature thereof and I have found a temperature of say from 350° F. to 450° F. with an optimum mean of 400° F. will do very satisfactory toasting of a thin slice of bread. The clamping of the thin slice of bread between two substantially parallel extending plates of metal is effective also to prevent any curling or curving of the thin toasted slices of bread.

I may here point out also that I may blacken the one side of each of the plates 119, this side being that in which the spurs or projections 125 extend so that the blackened surface of the two metal plates will be subject to high temperature radiant heat during the toasting of a thin slice of bread.

The toaster embodying my invention and including the bread slice holder 117 therefore provides means for selectively toasting either a slice of bread of normal thickness with surface toasting only or to thoroughly toast a relatively thin slice of bread throughout its entire thickness while the same is prevented from curling or curving as happens if the slice of bread is not prevented by proper means from so doing.

Various modifications of the structure shown in my invention may be made and all modifications clearly coming within the scope of the appended claims are to be considered covered thereby.

I claim as my invention:

1. A dual purpose electric toaster comprising toast heating elements defining a toasting chamber, a thermally-responsive switch for controlling the energization of the toast heating elements, means normally holding said switch in closed position, a bread slice holder insertible into the toaster and effective to move said switch holding means out of its normal position to cause said thermally-responsive switch to operate and limit the maximum temperature of the toasting chamber during a toasting operation.

2. An electric toaster comprising a toasting chamber, toast heating elements in said chamber, a switch for said toast heating elements normally biased into open position, a lever arm normally yieldingly biased into position to hold said switch closed, a thermal element subject to toasting chamber temperature effective when cold to hold said switch closed, a bread slice holder comprising a pair of flat metal plates pivotally connected to each other insertible into the toasting chamber into bread toasting position and effective when in said bread toasting position to move said lever arm out of switch-holding position and to cause said thermal element to actuate said switch to maintain a given average temperature in said toasting chamber during a toasting operation.

3. An electric toaster comprising a toasting chamber, toast heating elements in said chamber, a switch for said toast heating elements normally biased into open position, a lever arm normally yieldingly biased into position to hold said switch closed, a thermal element subject to toasting chamber temperature effective when cold to hold said switch closed, a bread carrier vertically movable relative to said toast heating elements into an upper non-toasting position and a lower toasting position and normally yieldingly biased into non-toasting position, a bread slice holder comprising a pair of flat metal plates pivotally connected to each other adapted to be placed on said carrier, means to move said carrier and said bread slice holder into the lower toasting position, said bread slice holder being adapted when in toasting position to engage said lever arm and move it out of switch-holding position to cause said thermal element to control said switch to maintain a given average temperature in said toasting chamber during a toasting operation.

4. A dual purpose electric toaster comprising a toasting chamber, electric heaters in said chamber, a switch for said heaters normally biased into open position, means normally yieldingly biased into position to hold said switch closed, a thermostat subject to toasting chamber temperature adapted when cold to hold said switch closed, a bread carrier vertically movable relative to said heaters into upper non-toasting position and lower toasting position and normally yieldingly biased into non-toasting position and selectively adapted to support a slice of bread of normal thickness and a slice of bread of appreciably lesser thickness, a bread slice holder comprising a pair of parallel-extending flat metal plates for holding a slice of lesser thickness and prevent it from curving during toasting, said holder being effective when said carrier and holder are in their lower toasting position to engage said means normally holding said switch closed and move it out of switch-engaging position to cause said thermostat to control said switch to maintain a given average temperature in said toasting chamber during a toasting operation.

5. A dual purpose electric toaster comprising a toasting chamber, electric heaters in said chamber, a bread carrier vertically movable relatively to said heaters into an upper non-toasting position and a lower toasting position and normally yieldingly biased into its non-toasting position and adapted to support selectively a slice of bread of normal thickness and a slice of bread of appreciably lesser thickness, a bread slice holder comprising a pair of relatively thin flat metal plates for holding therebetween a slice of lesser thickness and prevent it from curving during toasting and a normally-inoperative thermally-actuable heater control switch adapted to be rendered operative by said bread slice holder when said holder is on said carrier and in toasting position to maintain a given average temperature in the toasting chamber during a toasting operation.

JOHN R. GOMERSALL.